3,282,927
5-PHENYL-4-THIAZOLYLPENICILLINS
Thomas Alfred Montzka, Manlius, N.Y., assignor to
Bristol-Myers Company, New York, N.Y.
No Drawing. Filed May 21, 1964, Ser. No. 369,278
8 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive bacteria and, more particularly relates to novel 5-phenyl-4-thiazolylpenicillins which may contain certain substituents in the benzene ring and which may bear certain substituents at the 2-position of the thiazole ring, and nontoxic, pharmaceutically acceptable salts thereof.

Antibacterial agents of the penicillin class have proven highly effective in the therapy of infections due to Gram-positive bacteria but nearly all such penicillins are ineffective against numerous so-called resistant strains of bacteria, e.g. benzylpenicillin-resistant strains of *Staphylococcus aureus* (*Micrococcus pyogenes* var. *aureus*). It is the object of the present invention to provide novel compounds which are effective against such resistant strains. It is a further object of the present invention to provide penicillins active against resistant Staphylococci which are efficiently absorbed upon oral administration to man and animals.

The objects of the present invention have been achieved by the provision, according to the present invention, of a compound selected from the group consisting of an acid of the formula

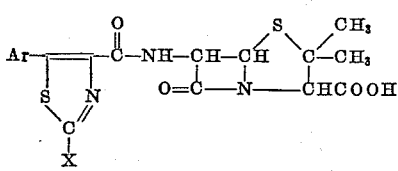

wherein X represents a member selected from the group consisting of hydrogen, (lower)alkyl, carbobenzyloxyamino, amino and Ar—(CH$_2$)$_n$— and n represents an integer from zero to three inclusive and Ar represents a radical of the formula

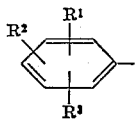

wherein R$^1$, R$^2$ and R$^3$ each represent a member selected from the group consisting of hydrogen, fluoro, chloro, bromo, iodo, trifluoromethyl, (lower)alkyl, (lower)alkoxy, nitro, methylsulfonyl, di(lower)alkylamino and (lower)alkylmercapto; and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabietylethylenediamine, N-(lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Similarly, where the term "(lower)" is used as part of the description of another group, e.g. "(lower)alkoxy" it refers to the alkyl portion of such group which is therefore as described above in connection with "(lower)alkyl." Also included within the scope of the present invention are easily hydrolyzed esters and amides which are converted to the free acid form by chemical or enzymatic hydrolysis.

The preferred compounds of the present invention have the formulae

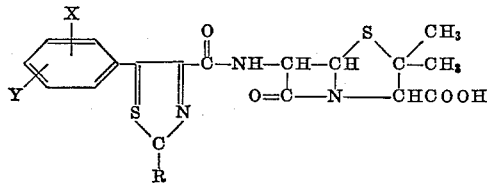

wherein X and Y are hydrogen or chloro and R is hydrogen or (lower)alkyl.

The products of the present invention are prepared by the reaction of 6-aminopenicillanic acid, preferably in the form of a neutral salt such as the sodium salt or the triethylamine salt, with an acid chloride having the formula

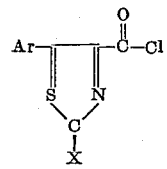

wherein X is hydrogen, (lower)alkyl, carbobenzyloxyamino, amino or Ar—(CH$_2$)$_n$— and n is an integer from zero to three inclusive and Ar represents a radical of the formula

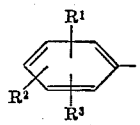

wherein R$^1$, R$^2$ and R$^3$ each represent hydrogen, fluoro, chloro, bromo, iodo, trifluoromethyl, (lower)alkyl, (lower)alkoxy, nitro, methylsulfonyl, di(lower)alkylamino and (lower)alkylmercapto, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. In addition, an acid azide or an active ester or thioester (e.g. with p-nitrophenol, thiophenol, thioacetic acid) may be used or the free acid itself may be coupled with 6-aminopenicillanic acid by the use of enzymes or of a carbodiimide reagent [cf. Sheehan and Hess, J. Amer. Chem. Soc., 77, 1067 (1955)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well-known in the art.

Where $R^4$ is carbobenzyloxyamino it is necessary after the penicillin has been prepared to convert the carbobenzyloxyamino group to a free amino group by catalytic hydrogenation, as in U.S. Patent 2,985,648. Other equivalent blocking groups can be used in place of the carbobenzyloxy group in the same fashion. Thus, where the 2-substituent is

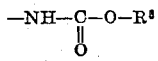

$R^5$ may be allyl, tertiary, butyl, phenyl or substituted phenyl, benzyl or substituted benzyl or $R^5OCO$— may be the trityl group $(C_6H_5)_3C$—. The blocking group $R^5OCO$— may be removed by hydrogenation of the protected aminoacyl derivative of 6-aminopenicillanic acid in the presence of a catalyst such as palladium, platinum or rhodium on an inert support such as carbon, barium carbonate, strontium carbonate, or diatomaceous earth. Hydrogenation is preferably carried out at room temperature and at atmospheric pressure in a solvent such as water, non-reducible organic solvent such as ethanol or dioxane, or aqueous solutions of such organic solvents, the pH of the reaction mixture being essentially neutral, e.g. 5 to 9.

The novel 5-phenyl-thiazole-4-carboxylic acids used to produce the compounds of the present invention are prepared as exemplified below by condensation of β-bromopyruvic acids with thioformamide [see Helv. Chim. Acta, 31, 2071 (1948)] or with a thioalkanoic acid amide or the like, e.g. thioacetamide, thiobenzamide, thiophenylacetamide or with a thiourea, e.g. thiourea and N-carbobenzyloxythiourea. The β-bromo-phenylpyruvic acids have the formula

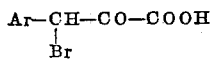

and are prepared as exemplified below by direct bromination of the corresponding phenylpyruvic acids.

The required phenylpyruvic acids have the formula Ar—$CH_2COCOOH$ and, in turn, are prepared, for example, from the corresponding benzaldehydes of the formula Ar—CHO or

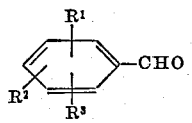

wherein $R^1$, $R^2$ and $R^3$ have the meaning set forth above by the procedure described for phenylpyruvic acid in Organic Syntheses, Collective Volume II, pages 1–3 and 519–520, John Wiley & Sons, Inc., New York, 1943.

Additional general methods of preparation and reactions of 5-aryl-thiazole-4-carboxylic acids are disclosed, for example, on pages 623–634 of Volume 5 of Heterocyclic Compounds, R. C. Elderfield, John Wiley & Sons, Inc., New York, 1957 and on pages 386–402 of Volume IV, Part A, of Chemistry of Carbon Compounds, E. H. Rodd, Elsevier Publishing Company, New York, 1957, and in J. Chem. Soc. (1950) pages 1947–1954 and in the references therein.

The following examples will serve to illustrate this invention without limiting it thereto. All melting points are uncorrected and all temperatures are given in degrees centigrade.

Example 1

*Phenylpyruvic acid* (I).—This acid was prepared by an adaptation of the Organic Synthesis procedure. A mixture of 117 g. (1.0 mole) of acetylglycine, 60 g. (0.74 mole) of anhydrous sodium acetate, 158.0 g. (1.49 moles) of benzaldehyde and 260 g. (2.53 moles) of acetic anhydride was warmed on a steam-bath with intermittent stirring until the solution was complete. The solution was heated at reflux for one hour and stored at 10° C. overnight. The tan crystalline cake was broken up in 250 ml. of cold water and collected. After washing with 100 ml. of ether the crude azlactone of α-acetaminocinnamic acid was recrystallized from boiling ethyl acetate to yield 92 g. (49%) of yellow crystalline rods with an M.P. of 149–150.5°. A total of 86 g. (0.46 mole) of azlactone was heated for four hours at reflux in 2 liters (2.0 moles) of 1 N hydrochloric acid and 100 ml. of acetone. The hot mixture was filtered and the filtrate was cooled in an ice-bath to obtain 48.3 g. (64%) of white crystals with an M.P. of 150–154°.

*Analysis.*—Calc'd for $C_9H_8O_3$: C, 65.9; H, 4.88. Found: C, 66.25; H, 4.98.

*β-Bromo-phenylpyruvic acid* (II).—To a stirred solution of 21.5 g. (0.132 mole) of phenylpyruvic acid in 300 ml. of glacial acetic acid was added dropwise 6.7 ml. (0.132 mole) of bromine over a five-minute period. The acetic acid was removed under reduced pressure at 35°. The residue crystallized when slurried with lower alkanes ("Skellysolve B"). The crystals were collected to yield 11.7 g. (52%). The infrared spectrum showed a strong carbonyl band at 5.8μ. The bromo acid is unstable and was used immediately for the preparation of the thiazole acids.

*2-methyl-5-phenyl-4-thiazolecarboxylic acid* (III).—To a refluxing solution of 1.4 g. (0.018 mole) of thioacetamide in 40 ml. of absolute alcohol was added 4.4 g. (.0181 mole) of β-bromo-phenylpyruvic acid. The solution was heated for five minutes and concentrated ammonium hydroxide was added until pH 10 was attained. The solution was cooled in an ice-bath and 3 g. (70.5%) of the crystalline ammonium salt was collected. The ammonium salt was dissolved in water and acidified to pH with 6 N hydrochloric acid to yield 2 g. of white plates with a M.P. of 140–143°

*Analysis.*—Calc'd for $C_{11}H_9NO_2S$: C, 60.25; H, 4.14. Found: C, 60.10; H, 4.05.

*Preparation of N,N'-dibenzylethylenediammonium-bis-6-(2-methyl-5-phenyl-4-thiazolecarboxamido)penicillanate* (VIII).—A solution of 4.0 g. (0.18 mole) 2-methyl-5-phenyl-4-thiazolecarboxylic acid and 2.05 g. (0.18 mole) 2,6-lutidine in 60 ml. dimethylformamide was cooled to 4° C. After adding 2.05 g. (0.019 mole) ethyl chloroformate, the reaction mixture was stirred for 15 minutes. Meanwhile, a solution of 4.3 g. (0.02 mole) of 6-aminopenicillanic acid in 20 ml. of water and 20 ml. of 2,6-lutidine was prepared and cooled to 10°. This solution was added all at once and stirring continued for 25 minutes. After diluting the solution with 500 ml. of water and washing it with ether, the pH was lowered to 2 with sulfuric acid and the penicillin free acid was extracted into 400 ml. of ether. The extract was dried over anhydrous magnesium sulfate and the solvent was removed under reduced pressure at 33°. The residue was dissolved in sodium bicarbonate buffered with acetic acid and a solution of 2.0 g. (0.0135 mole) N,N'-dibenzylethylenediamine diacetate in 50 ml. of water was added. The white crystalline salt was collected and dried over phosphorous pentoxide. A 2.5 g. portion of the 8.5 g. (85%) yield was washed with acetone and recrystallized from methanol-water to yield 1.2 g. with an M.P. of 142–144° (decomp.).

*Analysis.*—Calc'd for $C_{27}H_{29}N_4O_4S_2 \cdot H_2O$: C, 59.31; H, 5.35. Found: C, 59.05; H, 5.53.

*Conversion of VII to sodium 6-(2-methyl-5-phenyl-4-thiazolecarboxamido)penicillanate* (VIII).—A solution of 5.0 g. (0.0046 mole) of VII in 15 ml. of methanol and 40 ml. of water was acidified with 1:1 $H_3PO_4$ and extracted with ether. The extract was dried over magnesium sulfate and sodium 2-ethyl-hexanoate (50% in ether) was added slowly. The oil was crystallized in methyl isobutyl ketone to yield 1.0 g. white plates with an M.P. of 195–200° (decomp.).

*Analysis.*—Calc'd for $C_{19}H_{18}N_3O_4S_3Na \cdot 3H_2O$: C, 46.24; H, 4.88. Found: C, 46.80; H, 4.38.

This product as the sodium salt was found to contain the β-lactam structure as shown by infrared analysis and to inhibit *Staph. aureus* Smith at 0.5 to 1.0 mcg./ml. to inhibit the highly benzylpenicillin-resistant *Staph. acreus* BX–1633–2 at 1.6 to 3.1 mcg./ml., to exhibit versus *Staph. aureus* BX–1633–2 in mice a $CD_{50}$ of 45–95 mgm./kg. upon intramuscular injection (compared to a $CD_{50}$ of 35–45 mgm./kg. for oxacillin) and a $CD_{50}$ of 130 mgm./kg. upon oral administration (compared to a $CD_{50}$ of 320 mgm./kg. for oxacillin).

*Example 2*

Sodium 2 - amino - 5 - phenyl - 4 - thiazolecarboxylate (IV).—To a refluxing solution of 1.5 g. (0.0197 mole) thiourea in 100 ml. of absolute ethanol was added 5 g. (0.0207 mole) of II. Heating was continued for three minutes and 20% sodium hydroxide was added to pH 10. The solution was cooled in an ice-bath and the sodium salt was collected to give 4.1 g. (94%) of white plates with an M.P. of 320–322°.

*Analysis.*—Calc'd for $C_{10}H_7N_2O_2SNa \cdot \frac{1}{2}H_2O$: C, 47.80; H, 3.61. Found: C, 48.10; H, 2.90.

2-(benzyloxycarbonylamino) - 5-phenyl - 4-thiazolecarboxylic acid (VI).—A solution of 4.1 g. (0.0168 mole) of IV in 10 ml. of water was cooled to 5° and 3.2 g. (0.0185 mole) of carbobenzoxy chloride was added dropwise over a 15-minute period. After stirring for one hour at 3° the mixture was diluted with one volume of water and acidified to pH 2 with 6 N hydrochloric acid. The yield was 1.85 g. of white crystals with an M.P. 238–241°.

Preparation of potassium 6-[2-(benzyloxycarbonylamino) - 5-phenyl - 4-thiazolecarboxamido]penicillanate (IX).—The method used for compound VII was followed in causing 2.6 g. (0.0073 mole) 2-(benzyloxycarbonylamino)-5-phenyl-4-thiazolecarboxylic acid to react with 1.58 g. (0.0073 mole) 6-aminopenicillanic acid. The free acid, an oil, was dissolved in a small volume of ether and potassium 2-ethyl hexanoate (50% in ether) was added slowly. A pale yellow amorphous solid precipitated and when collected and dried over phosphorous pentoxide was found to weigh 1.0 g. (36% yield). The M.P. is 216–225° (decomp.).

*Analysis.*—Calc'd for $C_{26}H_{23}N_4O_6S_2K \cdot 2H_2O$: C, 46.51; H, 4.43. Found: C, 46.80; H, 4.51.

Preparation of 6-[2-amino-6-phenyl-4-thiazolecarboxamido]penicillanic acid (X).—A solution of 3.5 g. (0.006 mole) of IX in 80 ml. of water was adjusted to pH 8 with sodium hydroxide, buffered with acetic acid and treated with decolorizing carbon. It was then hydrogenated on a Parr hydrogenation apparatus at 50 p.s.i. for ½ hour in the presence of 3.5 g. 30% palladium on diatomaceous earth. The catalyst was removed by filtration after adjusting the pH to 2 with hydrochloric acid. The pH was readjusted to 6 and the solvent was removed at 37° in vacuo. The solid was slurried with acetone and filtered. The filtrate was evaporated under reduced pressure to yield a gum which was dissolved in n-butanol and precipitated by the addition of lower alkanes ("Skellysolve B"). The solid was dried for 16 hours over phosphorous pentoxide to give 251 mg. of yellow solid with an M.P. of 155–157°. The infrared spectrum showed water, NH, 3400 cm.$^{-1}$; β-lactam carbonyl, 1775 cm.$^{-1}$, amide carbonyl, 1680 cm.$^{-1}$ and 1530 cm.$^{-1}$;

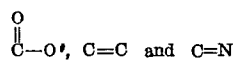

1610 cm.$^{-1}$ and 1400 cm.$^{-1}$.

This penicillin with the free amino group on the 2-position of the thiazole ring inhibited *Staph. aureus* Smith at 1.0–1.6 mcg./ml. and inhibited the benzylpenicillin-resistant *Staph. aureus* BX–1633–2 at 6.3–12.5 mcg./ml.

The corresponding penicillin with the 2-carbobenzyloxyamino group inhibited *Staph. aureus* Smith at 0.25 mcg./ml. and *Staph. aureus* BX–1633–2 at 1.6 mcg./ml.

*Example 3*

5-phenyl-4-thiazolecarboxylic acid (V).—In a preparation analogous to III, 15.0 g. (0.0616 mole) β-bromophenylpyruvic acid was caused to react with 4.0 g. freshly prepared thioformamide made by the method of Erlenmeyer and Menze, Helv. Chim. Acta, 31, 2071 (1948). The ammonium salt was dissolved in water and the free acid precipitated by the addition of acetic acid to give 9.8 g. (approx. 74%) white needles, with an M.P. of 184–185°.

*Analysis.*—Calc'd for $C_{10}H_7NO_2S$: C, 58.53; H, 3.44. Found: C, 58.75; H, 3.54.

Sodium 6-[5-phenyl-4-thiazolecarboxamido]pencillanate.—In a method analogous to the one used for compound IX, 4.0 g. (0.019 mole) of 5-phenyl-4-thiazolecarboxylic acid was caused to react with 4.0 g. (0.019 mole) 6-aminopenicillanic acid. The free acid was isolated as the sodium salt from butanol by addition of sodium 2-ethylhexanoate. The amorphous salt was collected and weighed 6.0 g. (83% with an M.P. of 180–182° 182° decomp.).

*Analysis.*—Calc'd for $C_{18}H_{16}NaN_3O_4S_2$: C, 50.81; H. 3.79. Found: C, 52.05; H, 4.82.

This penicillin as the sodium salt was found to contain the β-lactam structure by infrared analysis and to inhibit *Staph. aureus* Smith at 0.062–0.125 mcg./ml., to inhibit the benzylpenicillin-resistant *Staph. aureus* BX–1633–2 at 0.4–1.6 mcg./ml. and to exhibit versus *Staph. aureus* BX–1633–2 in mice a $CD_{50}$ of 45 mgm./kg. upon intramuscular injection (compared to a $CD_{50}$ of 45 mgm./kg. for oxacillin).

*Example 4*

Substitution for the benzaldehyde of Example 1 of an equimolar weight of 4-chlorobenzaldehyde,
2-chlorobenzaldehyde,
2,4-dichlorobenzaldehyde,
4-methylbenzaldehyde,
2-nitrobenzaldehyde,
4-fluorobenzaldehyde,
3-bromobenzaldehyde,
2-iodobenzaldehyde,
4-trifluoromethylbenzaldehyde,
3-methoxybenzaldehyde,
2,6-dimethoxybenzaldehyde,
3,4-dimethoxybenzaldehyde,
4-methylsulfonylbenzaldehyde,
4-dimethylaminobenzaldehyde and
4-methylmercaptobenzaldehyde, respectively, followed by the remaining steps set forth in that example produces Sodium 6-[2-methyl-5-(4'-chlorophenyl)-4-thiazole-carboxamido]penicillanate,
Sodium 6-[2-methyl-5-(2'-chlorophenyl)-4-thiazole-carboxamido]penicillanate,
Sodium 6-[2-methyl-5-(2',4'-dichlorophenyl)-4-thiazole-carboxamido]-penicillanate,
Sodium 6-[2-methyl-5-(4'-methylphenyl)-thiazole-carboxamido]penicillanate,
Sodium 6-[2-methyl-5-(2'-nitrophenyl)-4-thiazole-carboxamido]penicillanate,
Sodium 6-[2-methyl-5-(4'-fluorophenyl)-4-thiazole-carboxamido]penicillanate, Sodium 6-[2-methyl-5-(3'-bromophenyl)-4-thiazole-
carboxamido]penicillanate,
Sodium 6-[2-methyl-5-(2'-iodophenyl)-4-thiazole-
carboxamido]penicillanate,
Sodium 6-[2-methyl-5-(4'-trifluoromethylphenyl)-4-
thiazolecarboxamido]penicillanate,
Sodium 6-[2-methyl-5-(3'-methoxyphenyl)-4-thiazole-
carboxamido]penicillanate,
Sodium 6-[2-methyl-5-(2',6'-dimethoxyphenyl)-4-
thiazolecarboxamido]-penicillanate,
Sodium 6-[2-methyl-5-(3',4'-dimethoxyphenyl)-4-
thiazolecarboxamido]-penicillanate,
Sodium 6-[2-methyl-5-(4'-methylsulfonylphenyl)-4-
thiazolecarboxamido]penicillanate,
Sodium 6-[2-methyl-5-(4'-dimenthylaminopheyl)-4-
thiazolecarboxamido]-penicillanate and
Sodium 6-[2-methyl-5-(4'-methylmercaptophenyl)-4-
thiazolecarboxamido]penicillanate, respectively, which are isolated as their water-soluble sodium salts
and found to contain the β-lactam structure as shown by
infrared analysis and to inhibit Gram-positive bacteria,
e.g. *Staph. aureus*, at low concentrations.

*Example 5*

Substitution for the thioacetamide of Example 1 of an
equimolar amount of

Thiobenzamide,
Thio-p-chlorobenzamide,
Thiophenylacetamide,
Thio-o-chlorophenylacetamide,
Thio-p-methoxyphenylacetamide,
α-Methyl-thiophenylacetamide,
α-Ethyl-thiophenylacetamide,
Thio-β-phenylpropionamide,
Thio-γ-phenylbutyramide,
Thio-p-ethylphenylacetamide and
Thio-o,p-dichlorophenylacetamide, respectively, followed by the remaining steps set forth in that example
produces Sodium 6-[2-phenyl-5-phenyl-4-thiazolecarboxamido]
penicillanate,
Sodium 6-[2-(4'-chlorophenyl)-5-phenyl-4-thiazole-
carboxamido]penicillanate,
Sodium 6-[2-benzyl-5-phenyl-4-thiazolecarboxamido]
penicillanate,
Sodium 6-[2-(2'-chlorobenzyl)-5-phenyl-4-thiazole-
carboxamido]penicillanate,
Sodium 6-[2-(4'-methoxybenzyl)-5-phenyl-4-thiazole-
carboxamido]penicillanate,
Sodium 6-[2-(α-methylbenzyl)-5-phenyl-4-thiazole-
carboxamido]penicillanate,
Sodium 6-[2-(α-ethylbenzyl)-5-phenyl-4-thiazole-
carboxamido]penicillanate,
Sodium 6-[2-(β-phenethyl)-5-phenyl-4-thiazole-
carboxamido]penicillanate,
Sodium 6-[2-(γ-phenylpropyl)5-phenyl-4-thiazole-
carboxamido]penicillanate,
Sodium 6-[2-(4'ethylbenzyl)-5-phenyl-4-thiazole-
carboxamido]penicillanate and
Sodium 6-[2-(2',4'-dichlorobenzyl)-5-phenyl-4-thiazole-
carboxamido]penicillanate, respectively, which are isolated as their water-soluble sodium salts and
found to contain the β-lactam structure by infrared
analysis and found to be potent inhibitors of such Gram-
positive bacteria as *Staph. aureus*.

I claim:
1. A compound selected from the group consisting of
an acid of the formula

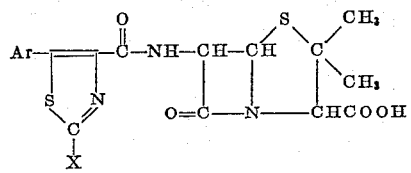

wherein X represents a member selected from the group
consisting of hydrogen, (lower)alkyl, carbobenzyloxy-
amino, amino and Ar—(CH$_2$)$_n$— and $n$ represents an
integer from zero to three inclusive and Ar represents a
radical of the formula

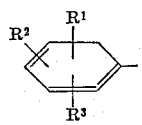

wherein R$^1$, R$^2$ and R$^3$ each represent a member selected
from the group consisting of hydrogen, fluoro, chloro,
bromo, iodo, trifluoromethyl, (lower)alkyl, (lower)al-
koxy, nitro, methylsulfonyl, di(lower)alkylamino and
(lower)alkylmercapto; and nontoxic, pharmaceutically
acceptable salts thereof.

2. A compound of the formula

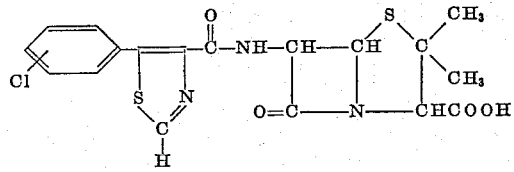

3. A compound of the formula

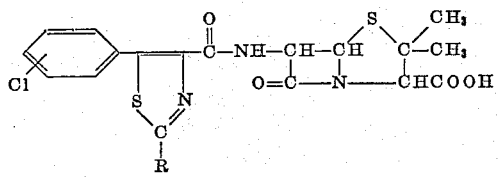

wherein R represents (lower)alkyl.

4. A compound of the formula

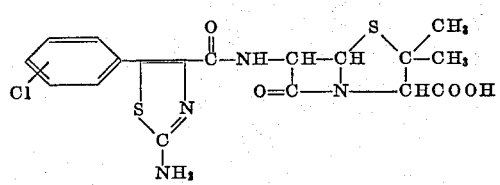

5. The compound of the formula

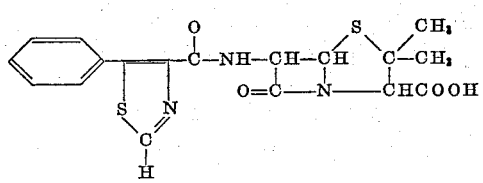

6. The compound of the formula

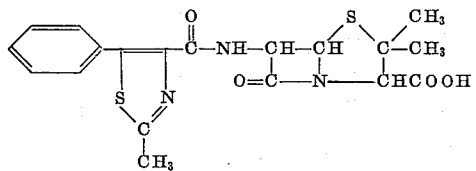

7. The compound of the formula

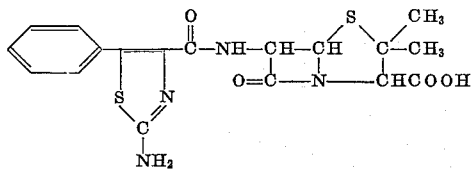

8. The compound of the formula

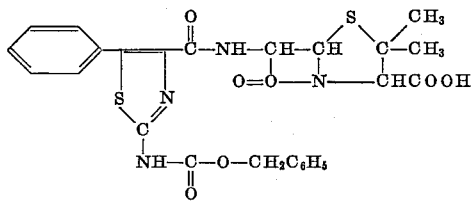

References Cited by the Examiner

UNITED STATES PATENTS

| | | | |
|---|---|---|---|
| 2,996,501 | 8/1961 | Doyle et al. | 260—239.1 |
| 3,159,617 | 12/1964 | Sheehan | 260—239.1 |
| 3,174,964 | 3/1965 | Hobbs et al. | 260—239.1 |

References Cited by the Applicant

UNITED STATES PATENTS

| | | |
|---|---|---|
| 2,941,995 | 6/1960 | Doyle et al. |
| 2,951,839 | 9/1960 | Doyle et al. |
| 2,985,648 | 5/1961 | Doyle et al. |

OTHER REFERENCES

Cook et al.: J. Chem. Soc. (1950), 1947–1954.

Erlenmeyer and Menzl: Helv. Chim. Acta, 31, 2071–2075 (1948).

Sheehan and Hess: J. Amer. Chem. Soc., 77, 1067 (1955).

ALEX MAZEL, *Primary Examiner.*

HENRY R. JILES, *Examiner.*

JAMES W. ADAMS, JR., *Assistant Examiner.*